Dec. 18, 1945.                H. L. CLARK                2,391,225
            SPARK GENERATOR FOR SPECTROGRAPHIC ANALYSES
                        Filed Oct. 21, 1943
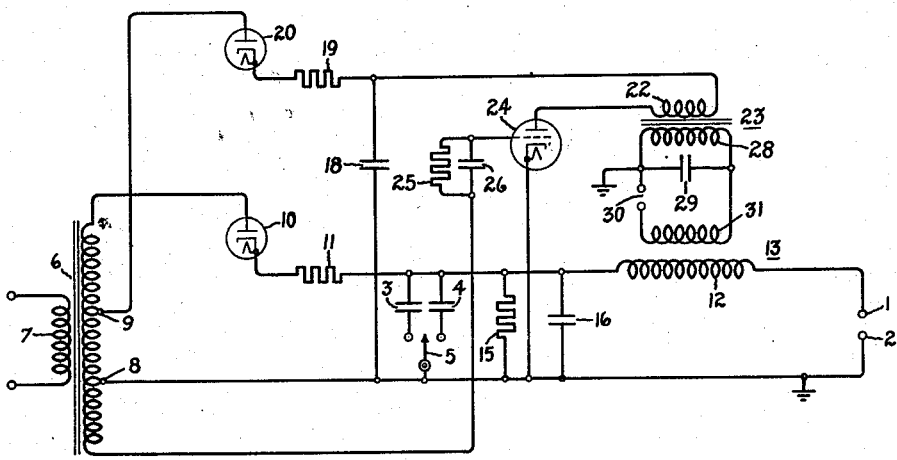
Inventor:
Howard L. Clark,
by Harry E. Dunham
His Attorney.

Patented Dec. 18, 1945

2,391,225

UNITED STATES PATENT OFFICE 2,391,225

SPARK GENERATOR FOR SPECTROGRAPHIC ANALYSES

Howard L. Clark, Ballston Lake, N. Y., assignor to General Electric Company, a corporation of New York Application October 21, 1943, Serial No. 507,210

3 Claims. (Cl. 315—241)

My invention relates to spark generators for use in making spectrographic analyses and it has for its object the provision of an improved spark generator which is simple in form, reliable and efficient in operation and inexpensive to manufacture.

My invention will be better understood from the following description taken in connection with the accompanying drawing and its scope will be pointed out in the appended claims.

In the single figure of the drawing which is a circuit diagram illustrating my invention the main or arc discharge of the generator takes place at the test gap formed by the spaced electrodes 1 and 2 constructed of the material whose composition is to be analyzed. Energy for the discharge is supplied from either one of the two capacitors 3, 4, the capacitances of which may be 0.5 and 2 mfd. respectively, depending on the position of the switch 5. For charging whichever capacitor is to be employed I have provided the transformer 6 having the primary 7 which is adapted to be connected to a suitable source of alternating current supply, for example a 115 volt, 60 cycle lighting circuit. The transformer has a plurality of secondaries comprising preferably a single winding provided as shown with a plurality of taps 8 and 9 whereby that part of the winding between the tap 8 and the upper end of the winding constitutes one secondary, that part between the taps 8 and 9 constitutes another secondary, and that part between the tap 8 and the lower end of the winding constitutes still another secondary. According to the position of the switch 5 either capacitor 3 or capacitor 4 is connected through the half-wave rectifier 10 and the resistor 11, whose resistance may for example be 750 ohms, across the secondary which is between the tap 8 and the upper end of the secondary winding, the voltage of which secondary may for example be 1100 volts. The discharge circuit for the capacitors 3 and 4 comprises the test gap between the electrodes 1 and 2 and the secondary 12 of the Tesla transformer 13. Across the capacitors 3 and 4 are connected the resistor 15, whose resistance may be 2 megohms to remove (for safety reasons) any charge that may be left on them after using the apparatus and also the small capacitor 16 whose capacitance may for example be .001 mfd. to provide a low impedance path for the high frequency induced in the secondary 12. The above described apparatus provides the power for the arc between the test gap electrodes but as the voltage of the charges put into the capacitors 3, 4 is not sufficient to cause a breakdown at the test gap I have provided other means which I shall now describe to produce a leader spark across the test gap.

Connected across that secondary of the transformer 6 which is between the taps 8 and 9 is the capacitor 18 whose capacitance may for example be 4 mfd., the resistor 19, whose resistance may for example be 330 ohms, and the half-wave rectifier 20, the arrangement being such that the capacitor 18 and the capacitors 3, 4 receive charges from the transformer 6 during the same half cycles. The discharge circuit of the capacitor 18 comprises the primary 22 of the step-up transformer 23, whose ratio of transformation may for example be 1 to 10, and the anode-cathode circuit of the grid controlled gaseous discharge device 24. The grid circuit of the device 24 includes in addition to the usual high resistor 25 shunted by the small capacitor 26 the negative bias secondary of the transformer 6 comprising that part between the tap 8 and the lower end of its secondary winding. The secondary 28 of the step-up transformer 23, whose ratio of transformation may for example be 1 to 10, has connected across it the small capacitor 29, whose capacitance may for example be .0025 mfd. and bridged across that capacitor and forming therewith an oscillation circuit is the spark gap 30 and the primary 31 of the aforementioned Tesla transformer 13, whose ratio of transformation may for example be 1 to 5.

With reference now to the operation of the above described apparatus, during the first half cycle of the source voltage at which the rectifiers 10 and 20 pass current a charge is given to one or the other of the capacitors 3, 4 according to the position of the switch 5 and a charge likewise is given to the capacitor 18. As mentioned before the voltage of the charge given to the capacitors 3, 4 is insufficient to cause the gap between the electrodes 1 and 2 to break down. The discharge device 24 which controls the discharge of the capacitor 18 and its production of the leader spark across the electrodes 1, 2 is rendered nonconducting by reason of the negative bias on its grid. At the following half cycle of the source voltage the bias on the grid of the device 24 changes from negative to positive or at least becomes sufficiently less negative to render the device conducting at which time the capacitor 18 discharges through the primary of the transformer 23. The resulting voltage impulse induced in the secondary of that transformer gives a charge to the capacitor 29, the voltage of which charge is enough to make the gap 30 break down and start oscillations in the primary of the Tesla transformer. These high frequency impulses superposed on the charge voltage of the capacitors 3 or 4 cause a leader spark to appear at the test gap 1, 2 which leader is immediately followed by an arc discharge fed from capacitor 3 or 4. The above sequence of operations described as taking place during a single cycle of applied voltage is repeated for each following cycle during all of which the resulting intermittent arc between the test electrodes produces a spectrum which is characteristic of the particular element or elements of which they are composed.

What I claim as new and desire to secure by Letters Patent of the United States is:

1. In combination a capacitor and a half wave rectifier connected in series to be energized from a source of alternating current supply, a discharge circuit for said capacitor including a spark gap, a second capacitor and a second half wave rectifier connected in series to be energized from said source of supply, a high frequency generator, a discharge circuit for said second capacitor including a grid controlled electron discharge device and means responsive to the discharge current passed thereby for energizing said generator, means energized by said source for controlling the grid circuit of said device, and means connected to said high frequency generator and interposed in series relation in the discharge circuit of said first-mentioned capacitor to said spark gap for inducing a high frequency voltage in said first mentioned discharge circuit from said generator.

2. In combination a capacitor and a half wave rectifier connected in series to be energized from a source of alternating current supply, a discharge circuit for said capacitor including a spark gap and a high frequency winding connected in series across said capacitor, a second capacitor and a second half wave rectifier connected in series to be energized from said source of supply, a discharge circuit for said second capacitor including the primary of a transformer and a grid controlled electron discharge device, means energized by said source for controlling the grid circuit of said device, and an oscillation circuit connected to be energized from the secondary of said transformer and including a series connected spark gap and high frequency winding inductively related to said high frequency winding.

3. A spark generator for spectrographic analysis comprising a supply transformer having a plurality of secondaries, a capacitor and a half wave rectifier connected in series across one of said secondaries, a discharge circuit for said capacitor including a test gap and the secondary of a Tesla transformer, a second capacitor and a second half wave rectifier connected in series across another of said secondaries whereby both of said capacitors receive a charge during the same half cycles, a discharge circuit for said second capacitor including the primary of a step-up transformer and the anode-cathode circuit of a grid controlled electron discharge device, another of said secondaries being connected to the grid circuit of said device to supply a hold-off bias thereto during the half cycles at which current is supplied to said second capacitor and to supply a turn-on bias thereto during the opposite half cycles, a small capacitor connected across the secondary of said step-up transformer, and an oscillation circuit including said small capacitor, a spark gap and the primary of said Tesla transformer.

HOWARD L. CLARK.